US007746786B2

(12) United States Patent
Ohishi et al.

(10) Patent No.: US 7,746,786 B2
(45) Date of Patent: Jun. 29, 2010

(54) RETRANSMISSION CONTROL METHOD AND DEVICE

(75) Inventors: Shinji Ohishi, Fukuoka (JP); Yuichiro Oishi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 11/806,965

(22) Filed: Jun. 5, 2007

(65) Prior Publication Data

US 2007/0291646 A1 Dec. 20, 2007

(30) Foreign Application Priority Data

Jun. 20, 2006 (JP) ............... 2006-170066

(51) Int. Cl.
*H04B 3/36* (2006.01)
*G06F 11/00* (2006.01)
*H04B 1/56* (2006.01)

(52) U.S. Cl. .................. 370/236; 370/274; 714/748; 455/7; 340/425.1

(58) Field of Classification Search ......... 370/236–293, 370/315–501; 379/237, 288; 711/E12.001, 711/E12.103, 162; 709/217, 237; 375/211; 340/425.1; 455/7–41.2, 38, 39; 714/18, 714/748

See application file for complete search history.

(56) References Cited

U.S. PATENT DOCUMENTS

| 6,640,094 | B1 * | 10/2003 | Tabeta | 455/260 |
| 2003/0105877 | A1 * | 6/2003 | Yagiu | 709/237 |
| 2006/0046655 | A1 * | 3/2006 | Terashima | 455/41.2 |

FOREIGN PATENT DOCUMENTS

| JP | 9186739 | 7/1997 |
| JP | 114472 | 1/1999 |
| JP | 2001229147 | 8/2001 |
| JP | 2002-271442 | 9/2002 |
| JP | 2003-249974 | 9/2003 |
| JP | 2004266420 | 9/2004 |
| JP | 2005-65289 | 3/2005 |
| JP | 2005-73251 | 3/2005 |
| JP | 200594230 | 4/2005 |

OTHER PUBLICATIONS

Notification of Reason for Refusal dated Mar. 9, 2010, from the corresponding Japanese Application.

* cited by examiner

*Primary Examiner*—Afsar M. Qureshi
(74) *Attorney, Agent, or Firm*—Hanify & King, PC

(57) ABSTRACT

In a retransmission control method and device which can suppress or expedite a retransmission of user data depending on a processing congestion status or the like on a receiving side, a user equipment on a data receiving side transmits to a radio network control device on a data transmitting side, when redundantly receiving an ACK request included in same user data, control data for extending a timeout period of a polling timer which is a retransmission time interval of user data for a subsequent ACK request by e.g. 10 ms. The radio network control device having received the control data extends the timeout period based on the control data. Alternatively, the radio network control device reduces, when receiving an ACK response from the user equipment within the timeout period, a timeout period of user data for a subsequent ACK request to less than the timeout period presently set.

20 Claims, 15 Drawing Sheets

RETRANSMISSION CONTROL METHOD AND DEVICE

BACKGROUND OF THE INVENTION

1. Field of the Invention

The present invention relates to a retransmission control method and device, and in particular to a method and device for controlling a retransmission of user data using an RLC (Radio Link Control) protocol.

2. Description of the Related Art

Prior art examples of such a retransmission control technology will now be described referring to FIGS. 12, 13A-13C, 14, and 15.

A radio communication system 1 shown in FIG. 12 is composed of a core network 10, a radio network control device 20 connected to the core network 10, a base station 30 managed by the radio network control device 20, and a user equipment (user terminal) 40 connected to the radio network control device 20 through the base station 30 to perform a packet data communication.

As shown in FIG. 13A for example, the packet data communication in the radio communication system 1 is performed, in which the radio network control device 20 on the transmitting side divides packet data SDU (Service Data Unit) into user data AMD_PDU (Acknowledged Mode Data Protocol Data Unit) of a size prescribed by the RLC protocol to be transmitted, and the user equipment 40 on the receiving side assembles (not shown) the original packet data SDU from the received user data AMD_PDU.

It is to be noted that while the radio network control device 20 and the user equipment 40 are respectively supposed to be on the transmitting side and the receiving side of the user data in order to simplify the description in the prior art example, the description hereinafter can be similarly applied to the reverse case where only the flow of the signal is reversed.

Also, the RLC protocol is for realizing both functions of a delivery acknowledgment (ACK) control and a retransmission control which will be described later for the user data AMD_PDU transmitted/received between the radio network control device 20 and the user equipment 40.

Delivery Acknowledgment Control: FIGS. 13A-13C

The format of the user data AMD_PDU includes, as shown in FIG. 13B, a data type D/C indicating whether the data is user data or control data which will be described later, a sequence No. SN indicating a connection sequence of divided user data, a polling bit P indicating whether or not the delivery acknowledgment control for the data is validated, an area HE storing a user data length or the like, length/indicator LI, a bit E, a data area DT storing data entity, and a padding PAD (or piggyback).

The radio network control device 20, as shown in FIG. 13A, divides the packet data SDU into e.g. three user data AMD_PDU0-AMD_PUD2, and assigns thereto sequence Nos. SN ("0000"-"0002") respectively to be sequentially transmitted to the user equipment 40.

Also, in order to perform the delivery acknowledgment control of the user data AMD_PDU0-AMD_PDU2, the radio network control device 20 sets the polling bit P of the last user data AMD_PDU2 "1" (valid) to be transmitted, which is made the delivery acknowledgment request (hereinafter, occasionally referred to as ACK request) for the user data AMD_PDU0-AMD_PDU2.

Supposing that all of the user data AMD_PDU0-AMD_PDU2 are normally transmitted/received, the user equipment 40 generates control data CTRL_PDU indicating a response (hereinafter, occasionally referred to as ACK response) to the ACK request to be transmitted to the radio network control device 20.

It is to be noted that for simplifying the figures, the ACK request and the ACK response in the attached figures are described in parentheses, which are added to the reference characters of the user data AMD_PDU including the ACK request and the control data CTRL_PDU indicating the ACK response, respectively. Hereinafter, the ACK request and the ACK response will be similarly described in the attached figures.

The format of the control data CTRL_PDU includes, as shown in FIG. 13C, a data type D/C indicating whether the data is the user data or the control data, a control type C_TYPE (where e.g. a reset RESET, a status report STATUS, or the like is set) indicating the control type of the data, a variable length decoding field SUFI, and a padding PAD. The decoding field SUFI is composed of an information type I_TYPE indicating a type of information added to the data, its information length "Length", and an information data area "Value" storing information entity.

It is to be noted that in this example, "status report STATUS" and "delivery acknowledgment ACK" are respectively set in the control type C_TYPE and the information type I_TYPE of the control data CTRL_PDU, and serial Nos. SN={0000, 0001, 0002} of the user data AMD_PDU0-AMD_PDU2 received by the user equipment 40 are set in the information data area "Value".

The radio network control device 20 having received the control data CTRL_PDU indicating the above-mentioned ACK response confirms whether or not the user data AMD_PDU0-AMD_PDU2 transmitted by the radio network control device 20 itself are normally delivered by referring to the control data CTRL_PDU.

Since the serial Nos. SN of all of the user data AMD_PDU0-AMD_PDU2 are set in the information data area "Value" within the control data CTRL_PDU in this example, the radio network control device 20 determines "normal (OK)" as a result of the delivery acknowledgment.

Retransmission Control: FIGS. 14 and 15

Control examples [1] and [2] by the retransmission control function provided by the RLC protocol will now be described referring to FIGS. 14 and 15.

Retransmission Control Example [1] (Upon Polling Timeout): FIG. 14

After transmitting the ACK request for the user data AMD_PDU0-AMD_PDU2, as shown in FIG. 14, the radio network control device 20 issues a polling timer (TIM) which measures a predetermined time and waits for the ACK response from the user equipment 40.

For example, in the event that the ACK request (i.e. user data AMD_PDU2) for the user data AMD_PDU0-AMD_PDU2 is missing due to the influence of the communication failure or the like, as shown by a mark "X" in FIG. 14, the user equipment 40 can not transmit the ACK response to the ACK request to the radio network control device 20. Therefore, the polling timer (TIM) issued by the radio network control device 20 times out.

To be exact, when a timeout period $T_0$ is fixed and there is no ACK response within the period, the radio network control device 20 regards that the ACK request for the user data AMD_PDU0-AMD_PDU2 transmitted is not normally received by the user equipment 40, so that the radio network control device 20 retransmits the user data AMD_PDU2 including the ACK request to the user equipment 40.

The user equipment 40 having normally received the user data AMD_PDU2 retransmitted generates the control data CTRL_PDU indicating the ACK response to the ACK request of the user data AMD_PDU0-AMD_PDU2 to be transmitted to the radio network control device 20.

The radio network control device 20 having received the control data recognizes that all of the user data AMD_PDU0-AMD_PDU2 are normally delivered, and determines "normal (OK)" as a result of the delivery acknowledgement.

Retransmission Control Example [2] (Upon List Reception): FIG. 15

When an omission of e.g. the user data AMD_PDU1 due to an influence of a communication failure or the like is detected within three user data AMD_PDU0-AMD_PDU2 transmitted from the radio network control device 20, as shown by the mark "X" in FIG. 15, the user equipment 40 generates the control data CTRL_PDU where the serial Nos. SN={0000, 0002} of the user data AMD_PDU0 and AMD_PDU2 normally received are set in the information data area "Value", and transmits the control data to the radio network control device 20 as the ACK response to the ACK request from the radio network control device 20.

Concurrently, the user equipment 40 requests the radio network control device 20 to retransmit the user AMD_PDU1. This retransmission request is performed by transmitting the control data CTRL_PDU where list "LIST" is set in the information type I_TYPE, and the serial No. SN="0001" of the user data AMD_PDU1 which requests the retransmission is set in the information data area "Value".

The radio network control device 20 having received the above-mentioned retransmission request sets a polling bit P of the user data AMD_PDU1 to "1" (valid) to be retransmitted, and performs the ACK request for the user data AMD_PDU1.

The user equipment 40 having normally received the user data AMD_PDU1 retransmitted generates the control data CTRL_PDU indicating the ACK response to the ACK request of the user data AMD_PDU1 to be transmitted to the radio network control device 20.

The radio network control device 20 having received the control data recognizes that all of the user data AMD_PDU0-AMD_PDU2 are normally delivered, and determines "normal (OK)" as a result of the delivery acknowledgement.

Thus, by performing the delivery acknowledgment control and the retransmission control for the user data transmitted/received, a communication quality between the radio network control device and the user equipment is guaranteed (see e.g. patent documents 1-4).

[Patent document 1] Japanese Patent Application Laid-open No. 2002-271442
[Patent document 2] Japanese Patent Application Laid-open No. 2003-249974
[Patent document 3] Japanese Patent Application Laid-open No. 2005-65289
[Patent document 4] Japanese Patent Application Laid-open No. 2005-73251

Recently, an introduction of a high-speed packet data communication standard such as HSDPA (High Speed Down Link Packet Access) has been considered in a packet data communication in the radio communication system. Accordingly, the traffic of the packet data transmitted (namely, the user data that is the packet data divided) is increased, so that a processing congestion may frequently occur specifically on the receiving side of the user data.

In this case, although the receiving side normally receives the user data for the delivery acknowledgment request in the above-mentioned retransmission control example [1], the response is delayed (namely, the response can not be transmitted within a predetermined time), resulting in a problem that the retransmission of the user data from the transmitting side is unnecessarily performed.

In order to avoid this problem, it is possible to take measures by preliminarily setting the waiting time for the response longer for the delivery acknowledgment request on the transmitting side. However, when the omission of the user data actually occurs, the retransmission thereof is delayed (namely, essentially necessary retransmission is suppressed), so that the throughput on the receiving side is unnecessarily reduced.

SUMMARY OF THE INVENTION

It is accordingly an object of the present invention to provide a retransmission control method and device which can suppress or expedite a retransmission of user data depending on a processing congestion status or the like on a receiving side.

[1] In order to achieve the above-mentioned object, a retransmission control method (or device) according to one aspect of the present invention comprises: a first step of (or means) receiving from a transmitting source a delivery acknowledgement request included in arbitrary first user data; and a second step of (or means) transmitting to the transmitting source, when a delivery acknowledgement request included in second user data same as the first user data is redundantly (or doubly) received, control data for extending a retransmission time interval of user data for a subsequent delivery acknowledgement request.

Namely, in the retransmission control method (or device), on a receiving side, according to one aspect of the present invention, at the first step (or means) a delivery acknowledgment request included in arbitrary first user data is received from a transmitting source, in the same way as the prior art example.

At the second step (or means), whether or not a delivery acknowledgement request included in second user data same as the first user data is redundantly (duplicately) received (namely, whether or not user data for the delivery acknowledgment request received is the same as the user data which has been already received) is determined.

The redundant or duplicate reception of the delivery acknowledgment request indicates that the transmitting source has retransmitted the user data including the delivery acknowledgment request before the transmission of a response to the delivery acknowledgment request (namely, a processing congestion or the like has occurred in the device itself, so that the response is delayed).

Therefore, when the delivery acknowledgment request is redundantly received, at the second step (or means) control data for extending a retransmission time interval of user data for a subsequent delivery acknowledgement request is transmitted to the transmitting source.

When the delivery acknowledgment request is not redundantly received (namely, when a processing congestion or the like has not occurred), at the second step (or means) the response is transmitted to the transmitting source every time a delivery acknowledgment request is received in the same way as the prior art example.

Thus, in the retransmission control method and device according to one aspect of the present invention, it is possible to request the transmitting source to suppress the retransmission of the user data depending on a processing congestion status or the like of the executor of the method or the device itself.

[2] Also, a retransmission control method (or device) according to one aspect of the present invention comprises: a first step of (or means) incorporating a delivery acknowledgement request into arbitrary user data to be transmitted; and a second step of (or means) extending, when control data requesting an extension of a retransmission time interval of user data for a subsequent delivery acknowledgement request is received from a transmitting destination of the delivery acknowledgement request, the retransmission time interval based on the control data.

Namely, the reception of the control data requesting the extension of the retransmission time interval of the user data on the transmitting side indicates that, as mentioned in the above-mentioned [1], the processing congestion or the like has occurred on the receiving side. Therefore, at the second step (or means) having received the control data, the retransmission time interval is extended based on the control data.

Thus, in the retransmission control method and device according to one aspect of the present invention, it is possible to suppress the retransmission of the user data depending on a processing congestion status or the like of the transmitting destination.

[3] Also, in the above-mentioned [1] or [2], the control data may include an identifier indicating the extension request of the retransmission time interval and an extension time value thereof.

Thus, it is possible to designate or set an extension time value of an optimum retransmission time interval depending on a processing congestion status or the like of the executor of the method or the device itself or the transmitting destination of the user data.

[4] Also, in a retransmission control method (or device) according to one aspect of the present invention comprises: a first step of (or means) determining whether or not a response to a delivery acknowledgement request incorporated into arbitrary user data is received from a transmitting destination within a retransmission time interval presently set; and a second step of (or means) reducing, when the response is received within the retransmission time interval presently set, a retransmission time interval of user data for a subsequent delivery acknowledgement request to less than the retransmission time interval presently set.

Namely, in the retransmission control method (or device), on a transmitting side, according to one aspect of the present invention, at the first step (or means) a response to a delivery acknowledgment request incorporated into arbitrary user data is received from a transmitting destination, and determines whether or not the response is received within the retransmission time interval presently set (namely, whether or not no processing congestion or the like has occurred in the transmitting destination and processing is executed within a time shorter than the present retransmission time interval).

When it is determined at the first step (or means) that the delivery acknowledgment request is received within the retransmission time interval presently set, the retransmission time interval of the user data for a subsequent delivery acknowledgment request is reduced to less than the retransmission time interval presently set, at the second step (or means).

Thus, in the retransmission control method and device according to one aspect of the present invention, it is possible to expedite a retransmission of user data depending on a processing congestion status or the like of a transmitting destination.

[5] Also, in the above-mentioned [4], the second step (or means) may include a step of (or means) stopping, when the response is received within the retransmission time interval presently set, a timer for measuring the retransmission time interval and assuming a time measured by the timer upon stopping the timer as the retransmission time interval.

Namely, at the second step (or means) the retransmission time interval is measured by using a timer, which is stopped when the response is received within the retransmission time interval presently set.

The time measured by the timer at this point indicates a value shorter than the retransmission time interval presently set and corresponding to a processing execution time in the transmitting destination, so that at the second step (or means) the time measured by the timer is assumed as a new retransmission time interval.

Thus, it is possible to set an optimum reduced time value of the retransmission time interval depending on the processing execution time of the transmitting destination of the user data.

[6] Also, in the above-mentioned [5], the second step (or means) may include a step of (or means) further adding a predetermined time to the time measured by the timer upon stopping the timer, which is assumed as the retransmission time interval.

Namely, in consideration of the occurrence of some variation in the processing execution time in the transmitting destination, at the second step (or means) a predetermined time is added to the time measured by the timer upon stopping the timer, which is assumed as a new retransmission time interval.

[7] Also, each of the steps (or means) of the method (or device) described in any of the above-mentioned [1]-[6] can be executed based on an RLC protocol (or can be mounted on an RLC protocol layer).

According to the present invention, it is possible to suppress and expedite the retransmission of the user data depending on a processing congestion status or the like on the receiving side, to perform an efficient packet data communication, and to enhance a throughput of the processing for the user data.

Also, since it is made possible to sequentially and dynamically set the extension time value or reduced time value of the retransmission time interval of the user data, an optimum communication quality can be constantly guaranteed.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Retransmission control embodiments [1] and [2] of a retransmission control method according to the present invention and a device executing the method will now be described referring to FIGS. 1A, 1B, 2-8, and FIGS. 9-11, respectively.

Figures 1A, 1B:
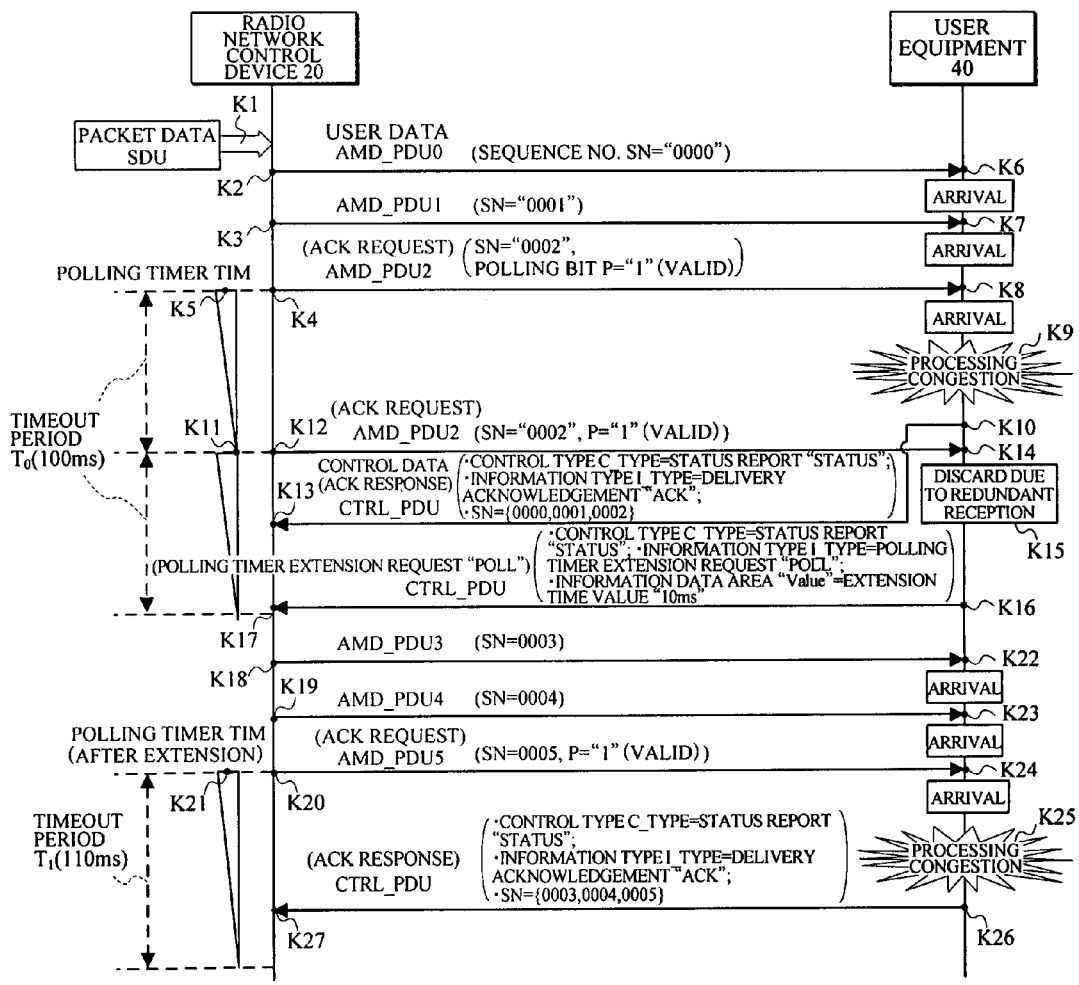
FIGS. 1A and 1B are sequence diagrams showing a retransmission control embodiment [1] of a retransmission control method and device according to the present invention.
Figure 9:
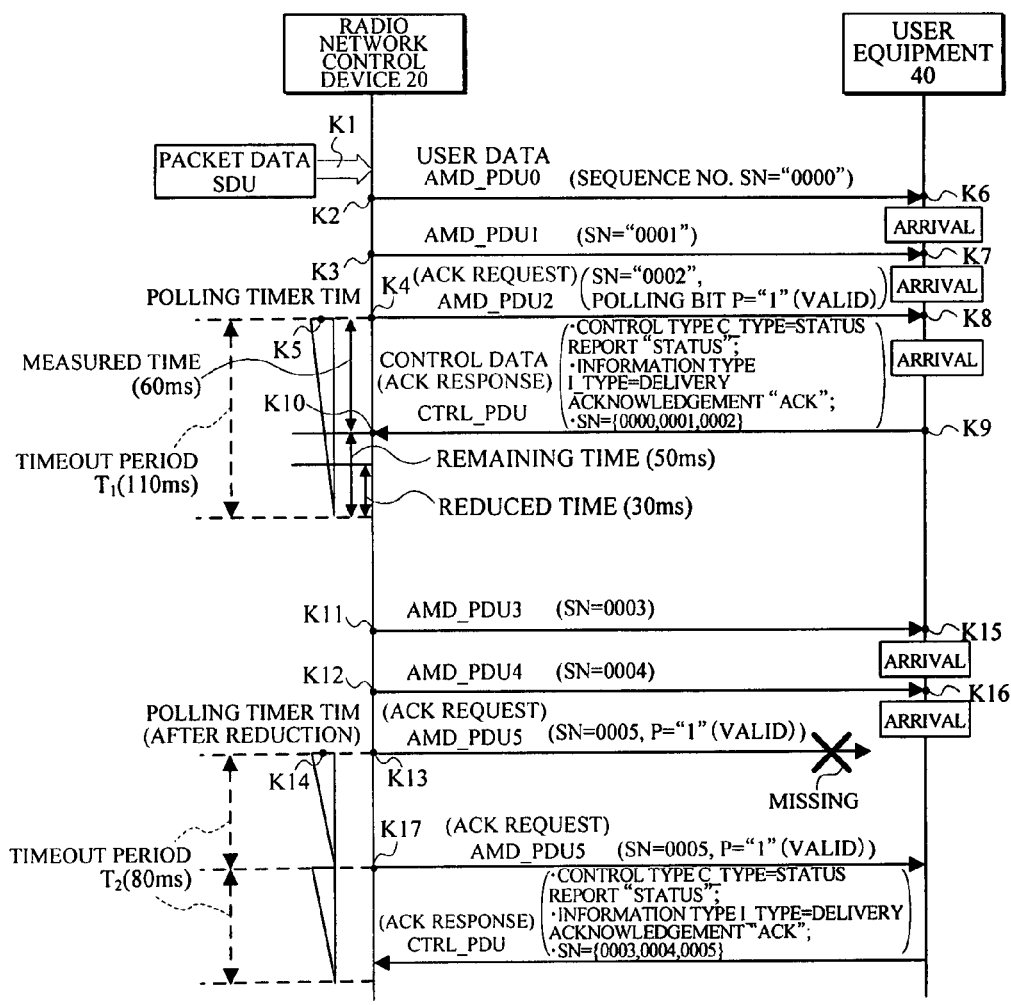
FIG. 9 is a sequence diagram showing a retransmission control embodiment [2] of a retransmission control method and device according to the present invention.

It is to be noted that while a radio network control device 20 and a user equipment 40 shown in FIGS. 1A, 1B, and 9 are respectively supposed to be on the transmitting side and the receiving side of the user data AMD_PDU in order to simplify the description in the embodiments [1] and [2], the description hereinafter can be applied vice versa, where only the flow of the signal is reversed.

⊙ Retransmission Control Embodiment [1] (Polling Timer Extension): FIGS. 1A, 1B, 2-8

FIG. 1A is a sequence diagram showing an entire operation of the embodiment [1], dealing with a case where a processing congestion occurs in the user equipment 40 on the receiving side of the user data AMD_PDU.

Firstly, when receiving (at step K1) packet data SDU from the upper layer (not shown) within the device, the radio network control device 20 divides the packet data SDU into e.g. three user data AMD_PDU0-AMD_PUD2, assigns sequence Nos. SN ("0000"-"0002") to the respective data to be sequentially transmitted (at steps K2-K4) to the user equipment 40.

At this time, the radio network control device 20 sets, in order to perform a delivery acknowledgment (ACK) control of the user data AMD_PDU0-AMD_PDU2, a polling bit P of the last user data AMD_PUD2 to "1" (valid) to make an ACK request.

Concurrently, the radio network control device 20 starts a polling timer (TIM) for measuring the retransmission time interval of the user data AMD_PDU2 for the ACK request, and waits for (at step K5) an ACK response from the user equipment 40. It is to be noted that as shown in FIG. 1A, a timeout period $T_0$ of the polling timer (TIM) is set to e.g. "100 ms".

It is supposed that although the user equipment 40 normally receives (at steps K6-K8) the user data AMD_PDU0-AMD_PDU2, as shown in FIG. 1A, a processing congestion occurs (at step K9) within the user equipment 40. Accordingly, the transmission of the ACK response to the ACK request is delayed (at step K10).

By this delay, the polling timer (TIM) reaches (at step K11) the timeout $T_0$ before the ACK response is received (at step K13) by the radio network control device 20. Therefore, the radio network control device 20 regards that the ACK request for the user data AMD_PDU0-AMD_PDU2 transmitted is not normally received by the user equipment 40, and retransmits (at step K12) the user data AMD_PDU2 including the ACK request to the user equipment 40.

The user equipment 40 having normally received (at step K14) the user data AMD_PDU2 retransmitted detects a redundant reception of the ACK request included in the user data AMD_PDU2 already received, so that the user equipment 40 discards (at step K15) the user data AMD_PDU2 retransmitted and transmits (at step K16) control data CTRL_PDU (hereinafter, referred to as polling timer extension request POLL) for extending the timeout period $T_0$ of the polling timer (TIM) of the user data (user data AMD_PDU3 and the following data shown in FIG. 1A) for a subsequent ACK request.

It is to be noted that for simplifying the figures the polling timer extension request (POLL) in the figures is shown in parentheses, being added to the reference character of the control data CTRL_PDU indicating the polling timer extension request POLL. Hereinafter, the polling timer extension request (POLL) will be similarly described in the attached figures.

Figure 13A:
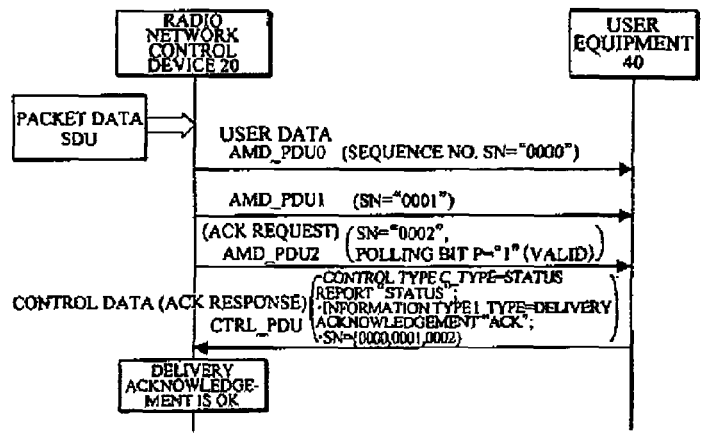
FIGS. 13A-13C are diagrams showing examples of a delivery acknowledgement control and a frame formant of an RLC protocol of the present invention and the prior art example.
Figure 13B:
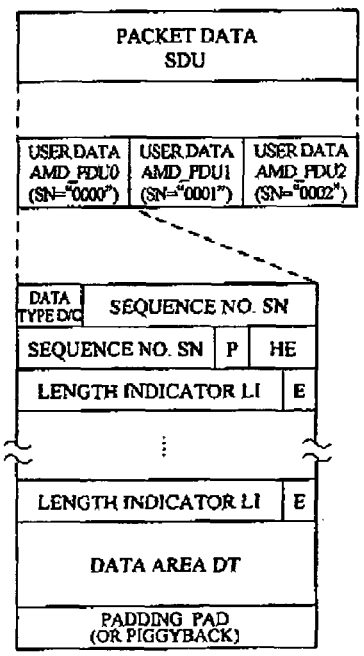
Figure 13C:
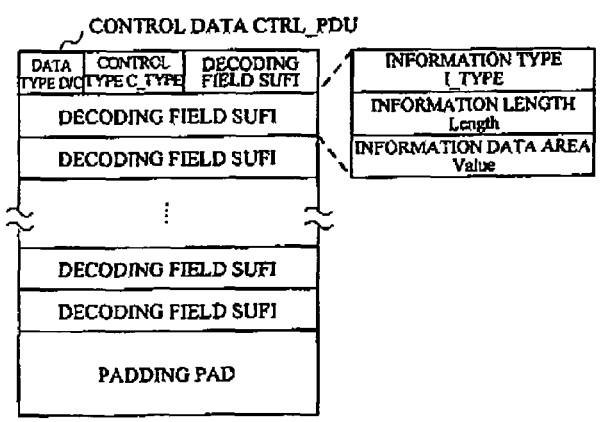
Figure 14:
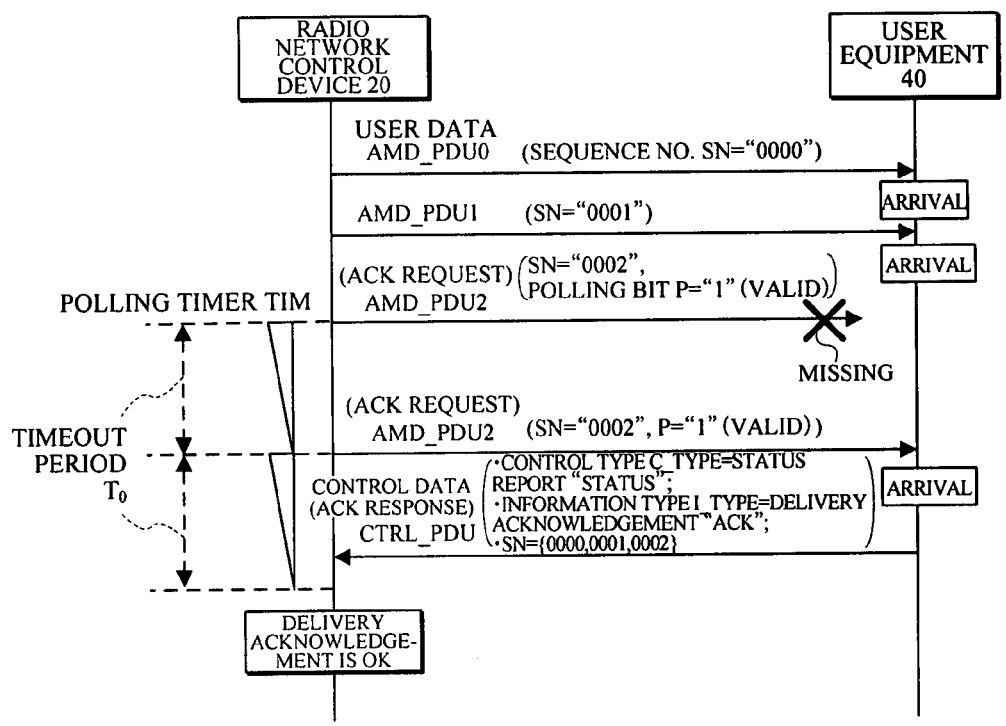
FIG. 14 is a sequence diagram showing a prior art retransmission control example [1]
Figure 15:
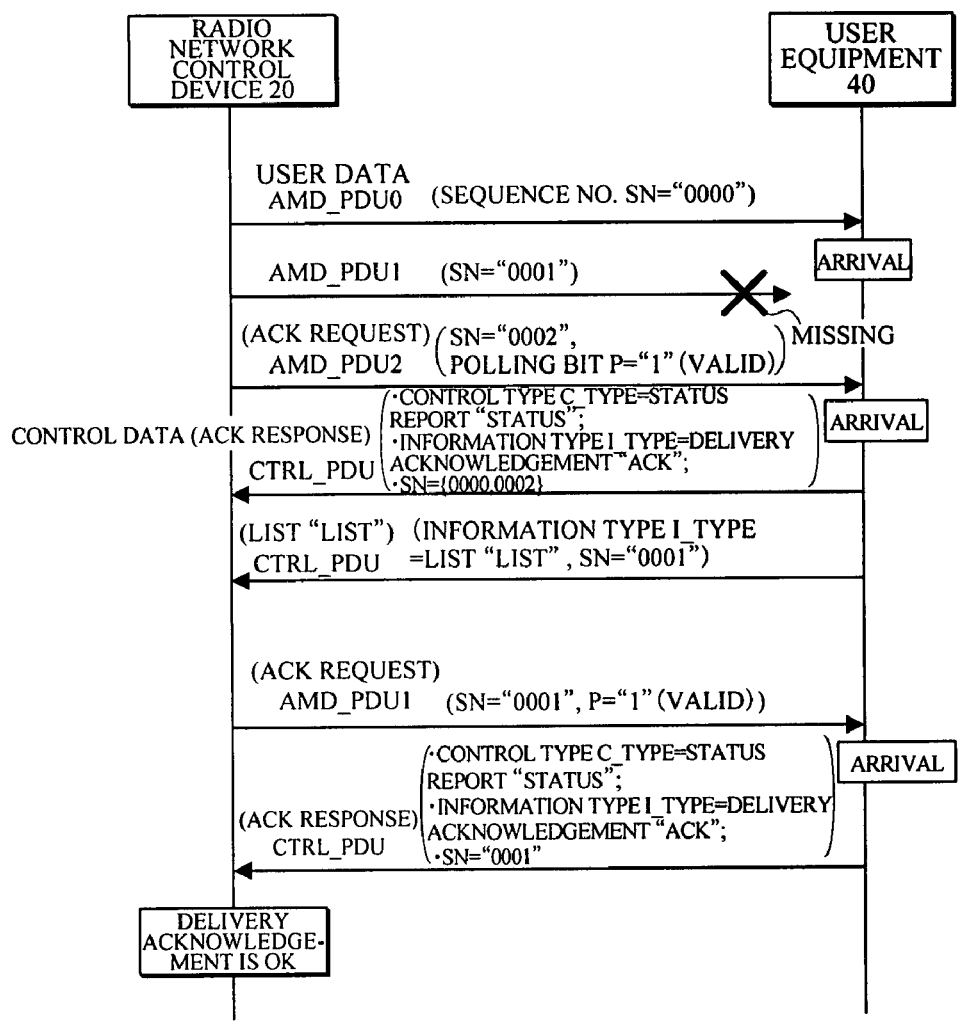
FIG. 15 is a sequence diagram showing a prior art retransmission control example [2].

As for the polling timer extension request POLL, the format of the control data CTRL_PDU shown in FIG. 13C can be used as it is.

As for the polling timer extension request (POLL) in this embodiment, "status report STATUS" is set in the control type C_TYPE within the format, as shown in FIG. 1A, in the same way as the ACK response. An identifier "polling timer extension request POLL" shown in FIG. 1B and its extension timer value (e.g. "10 ms") are respectively set in the information type I_TYPE and the information data area "Value" of decoding field SUFI, different from the ACK response, and are generated.

It is to be noted that the identifier "polling timer extension request POLL" is newly added to the existing information control type I_TYPE prescribed by the RLC protocol as shown by the dotted line in FIG. 1B.

The radio network control device 20 having received the control data CTRL_PDU indicating the polling timer extension request (POLL) sets (at step K17) the timeout period $T_0$ (100 ms) of the polling timer (TIM) managed within the device 20 to a new timeout period $T_1$ (110 ms) which is extended by "10 ms".

The radio network control device 20 measures (at steps K18-K21) the retransmission time interval of the user data AMD_PDU5 for a subsequent ACK request (corresponding to user data AMD_PDU3-AMD_PDU5) within the timeout period $T_1$.

Thus, in the same way as the above, even if the processing congestion occurs within the user equipment 40 which receives (at steps K22-K24) the user data AMD_PDU3-AMD_PDU5 so that the transmission of the ACK response is delayed (at steps K25 and K26), the ACK response is received (at step K27) by the radio network control device 20 within the extended timeout period $T_1$. Therefore, the retransmission of the user data AMD_PDU5 can be suppressed. Namely, the user equipment 40 may set the time value by which the processing congestion of the user equipment 40 itself can be relieved, as an extension time value for the timeout period $T_0$.

Hereinafter, an arrangement and operation examples of the radio network control device 20 and the user equipment 40 which realize the foregoing will be described referring to FIGS. 2-8. It is to be noted that in the following description, the operation sequence shown in FIG. 1A is used again for the description.

Figure 2:
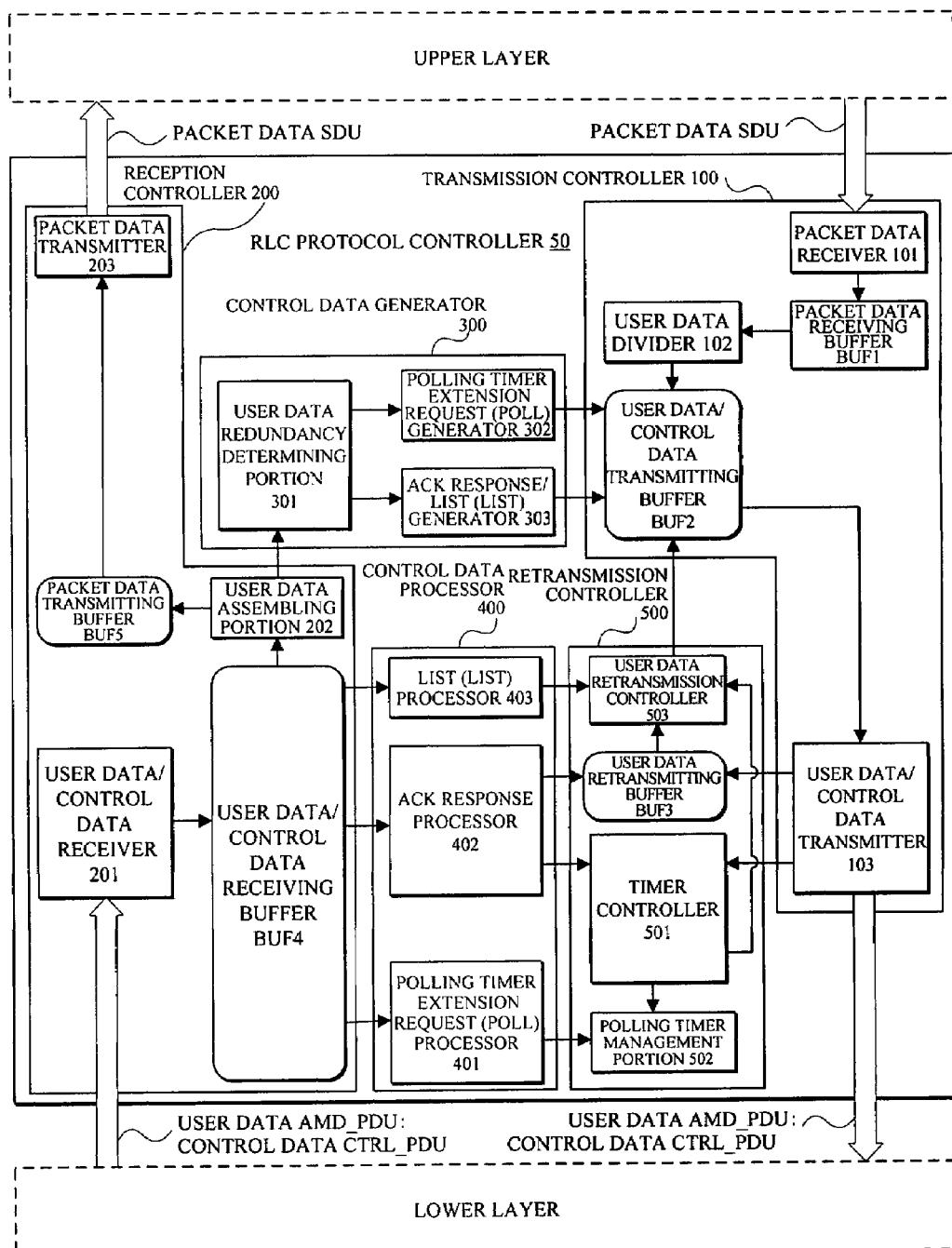
FIG. 2 is a block diagram showing an arrangement of a retransmission control method and device according to the present invention.

• Arrangement: FIG. 2

An RLC protocol controller 50 shown in FIG. 2 is mounted on an RLC protocol layer of both of the radio network control device 20 and the user equipment 40, being composed of a transmission controller 100, a reception controller 200, a control data generator 300, a control data processor 400, and a retransmission controller 500 which will be described hereinafter.

It is to be noted that this arrangement is similarly applied to the retransmission control embodiment [2] which will be described later.

Transmission Controller 100:

The transmission controller 100 is provided with a packet data receiver 101 which receives the packet data SDU from the upper layer, a packet data receiving buffer BUF1 which stores the received packet data SDU, a user data divider 102 which reads the packet data SDU from the buffer BUF1 to be divided into the user data AMD_PDU, a user data/control data transmitting buffer BUF2 which stores the divided user data AMD_PDU, and a user data/control data transmitter 103 which reads from the buffer BUF2 the user data AMD_PDU or the control data CTRL_PDU to be transmitted to the lower layer.

Figure 12:
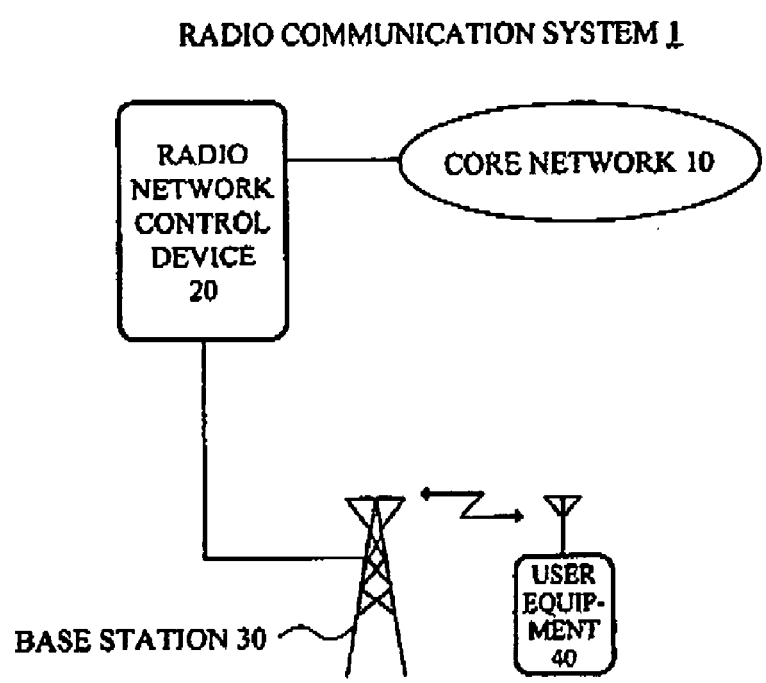
FIG. 12 is a block diagram showing an arrangement of a radio communication system of the present invention and the prior art example.

It is to be noted that the upper layer indicates, for the radio network control device 20, a layer which receives the packet data SDU from the core network 10 shown in FIG. 12, and indicates, for the user equipment 40, a layer such as an application generating the packet data SDU at a user's request.

Also, the lower layer indicates a layer in which the user data AMD_PDU or the control data CTRL_PDU are transmitted to the radio network control device 20 or the user equipment 40 opposed to each other.

Reception Controller 200:

The reception controller 200 is provided with a user data/control data receiver 201 which receives from the lower layer the user data AMD_PDU or the control data CTRL_PDU, a user data/control data receiving buffer BUF4 which stores the received user data AMD_PDU or the control data CTRL_PDU, a user data assembling portion 202 which reads the user data AMD_PDU from the buffer BUF4 to assemble the packet data SDU, a packet data transmitting buffer BUF5 which stores the assembled packet data SDU, and a packet data transmitter 203 which reads the packet data SDU from the buffer BUF5 to be transmitted to the upper layer.

Control Data Generator 300:

The control data generator 300 is provided with a user data redundancy determining portion 301 which determines a redundant reception based on the sequence No. SN of the user data AMD_PDU notified from the user data assembling portion 202, a polling timer extension request (POLL) generator 302 which generates the control data CTRL_PDU indicating the polling timer extension request (POLL) to be stored in the buffer BUF2, and an ACK response/list (LIST) generator 303 which generates the control data CTRL_PDU indicating the ACK response to the ACK request of the user data AMD_PDU or a list (LIST) for the user data detected as missing to be stored in the buffer BUF2.

Control Data Processor 400:

The control data processor 400 is provided with a polling timer extension request (POLL) processor 401 which reads the control data CTRL_PDU indicating the polling timer extension request (POLL) from the buffer BUF4 to output the timeout period extension request, an ACK response processor 402 which reads from the buffer BUF4 the control data CTRL_PDU indicating the ACK response, and a list (LIST) processor 403 which reads from the user data/control data receiving buffer BUF4 the control data CTRL_PDU indicating the list (LIST) to be processed.

Retransmission Controller 500:

The retransmission controller 500 is provided with a timer controller 501 which receives a timer start request from the user data/control data transmitter 103 or a timer stop request from the ACK response processor 402 to control the polling timer (TIM), a polling timer management portion 502 which receives a timeout period read request from the timer controller 501 or a timeout period extension request from the polling timer extension request (POLL) processor 401 and manages the timeout period of the polling timer (TIM), a user data retransmitting buffer BUF3 which stores the user data AMD_PDU transmitted by the user data/control data transmitter 103 for the retransmission, and a user data retransmission controller 503 which reads the user data AMD_PDU retransmitted from the buffer BUF3 upon the timeout of the polling timer (TIM) to be stored in the buffer BUF2.

• Operation Example of Each Block Portion: FIGS. 1A, 1B, and 2-8

The operation examples of the transmission controller 100, the reception controller 200, the control data generator 300, the control data processor 400, and the retransmission controller 500 shown in FIG. 2 will now be described referring to FIGS. 1A, 1B, and 2-8.

Operation Example of Transmission Controller 100: FIGS. 1A, 1B, and 2

The packet data receiver 101 within the transmission controller 100 shown in FIG. 2 stores (at step K1 of FIG. 1A) the packet data SDU received through the upper layer within the radio network control device 20 (on the transmitting side) shown in FIG. 1A in the packet data receiving buffer BUF1.

The user data divider 102 reads the packet data SDU from the packet data receiving buffer BUF1, divides the packet data into e.g. three user data AMD_PDU0-AMD_PDU2 as shown in FIG. 1A, and assigns thereto the sequence Nos. SN ("0000"-"0002") respectively to be stored in the user data/control data transmitting buffer BUF2. At this time, the user data divider 102 sets the polling bit P of the user data AMD_PDU2 to "1" (valid).

The user data/control data transmitter 103 sequentially reads the user data AMD_PDU0-AMD_PDU2 from the user data/control data transmitting buffer BUF2 to be transmitted to the lower layer.

Thus, the user data AMD_PDU0-AMD_PDU2 and their ACK requests are sequentially transmitted (at steps K2-K4) to the user equipment 40.

Concurrently, the user data/control data transmitter 103 provides to the timer controller 501 the timer start request of the polling timer (TIM) and the sequence No. SN "0002" of the user data AMD_PDU2 for the ACK request, and stores the user data AMD_PDU0-AMD_PDU2 in the user data retransmitting buffer BUF3.

It is to be noted that the user data AMD_PDU3-AMD_PDU5 and their ACK requests are also transmitted (at steps K18-K20) to the user equipment 40 in the same way as the above.

The user equipment 40 (on the receiving side) having received the user data AMD_PDU0-AMD_PDU2 or AMD_PDU3-AMD_PDU5 reads from the user data/control data transmitting buffer BUF2 the control data CTRL_PDU stored in the polling timer extension request (POLL) generator 302 or the ACK response/list generator 303 which will be described later to be transmitted to the lower layer.

Thus, the control data CTRL_PDU is transmitted (at steps K10, K16, and K26) to the radio network control device 20.

Operation Example of Reception Controller 200: FIGS. 1A, 1B, and 2-3

The user data/control data receiver 201 within the reception controller 200 shown in FIG. 2 stores (at steps K6-K8) the user data AMD_PDU0-AMD_PDU2 received through the lower layer within the user equipment 40 in the user data/control data receiving buffer BUF4.

Figure 3:
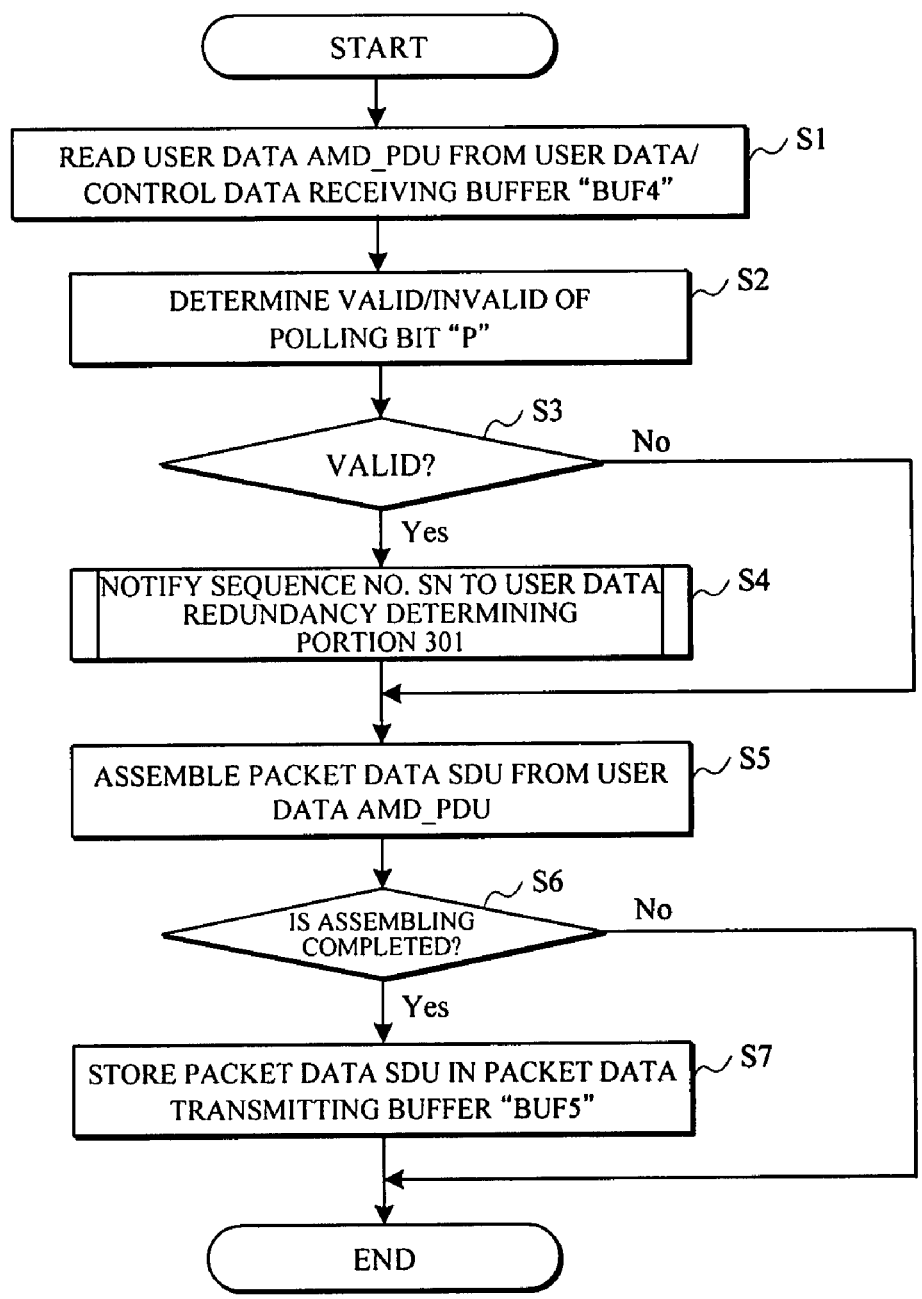
FIG. 3 is a flowchart showing an operation example of a user data assembling portion used for the present invention.

The user data assembling portion 202 sequentially reads (at step S1), as shown in FIG. 3, the user data AMD_PDU0-AMD_PDU2 from the user data/control data receiving buffer BUF4, and sequentially determines (at step S2) whether or not the polling bit P of the user data AMD_PDU0-AMD_PDU2 is "1" (valid).

Determining (at step S3) that the polling bit P of the user data AMD_PDU2 is "1" (valid), the user data assembling portion 202 notifies (at step S4) the sequence No. SN "0002" of the user data AMD_PDU2 to the user data redundancy determining portion 301.

The user data assembling portion 202 assembles (at step S5) the packet data SDU from the AMD_PDU0-AMD_PDU2.

When assembling the packet data SDU is completed (at step S6), the user data assembling portion 202 stores (at step S7) the packet data SDU in the packet data transmitting buffer BUF5.

The packet data transmitter 203 reads the packet data SDU from the packet data transmitting buffer BUF5 to be transmitted to the upper layer.

On the other hand, when assembling the packet data SDU is not completed (namely, e.g. the user data AMD_PDU1 (sequence No. SN="0001") is missing) at the above-mentioned step S6, the user data assembling portion 202 executes no processing. This is because the control data generator 300 (more specifically the ACK response/list (LIST) generator 303) requests the radio network control device 20 to retransmit the user data detected as missing. The missing user data is retransmitted from the radio network control device 20.

It is to be noted that the reception processing of the retransmitted user data AMD_PDU2 and the user data AMD_PDU3-AMD_PDU5 as well as the assembling processing of the packet data SDU are executed (at steps K14 and K22-K24) in the same way as the above.

Also, the radio network control device 20 stores (at steps K13, K17, and K27) the control data CTRL_PDU received through the lower layer by the user data/control data receiver 201 in the user data/control data receiving buffer BUF4.

Operation Example of Control Data Generator 300: FIGS. 1A, 1B, 2, 4, and 5

Figure 4:
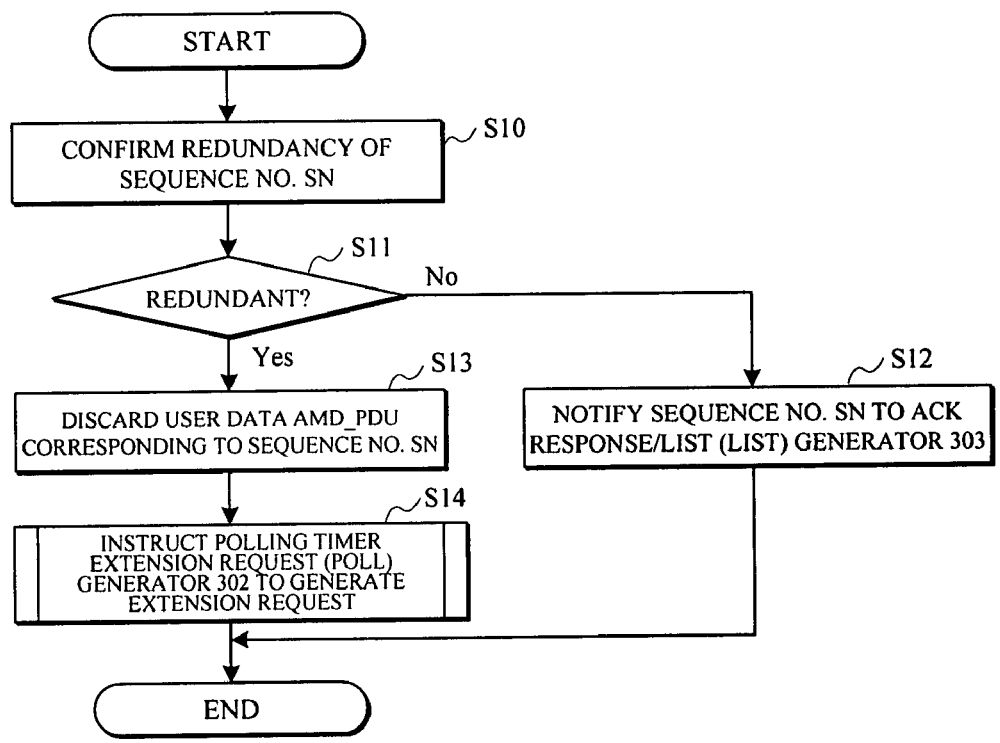
FIG. 4 is a flowchart showing an operation example of a user data redundancy determining portion used for the present invention.

The user data redundancy determining portion 301 within the control data generator 300 shown in FIG. 2 confirms (at step S10) the redundancy every time the sequence No. SN is notified from the above-mentioned user data assembling portion 202 as shown in FIG. 4.

In the user equipment 40, when the sequence No. SN "0002" of the user data AMD_PDU2 is firstly notified (at step K8), the user data redundancy determining portion 301 does not detect (at step S11) the redundancy, and notifies (at step S12) the sequence No. SN to the ACK response/list (LIST) generator 303.

The ACK response/list (LIST) generator 303 having received the sequence No. generates, in the same way as the prior art example, the control data CTRL_PDU indicating ACK response or the list (LIST) for the user data detected as missing, and stores the control data in the user data/control data transmitting buffer BUF2.

Thus, the user data/control data transmitter 103 transmits (at step K10) the ACK response or the list (LIST) to the radio network control device 20.

It is to be noted that when the sequence No. SN "0005" of the user data AMD_PDU5 is firstly notified (at step K24), its ACK response or list (LIST) is transmitted (at step K26) to the radio network control device 20 in the same way as the above.

On the other hand, when the transmission of the ACK response is delayed (at steps K9 and K10) due to e.g. the processing congestion of the transmission controller 100 within the user equipment 40, the user data redundancy determining portion 301 detects (at step K14) the redundancy of the sequence No. SN "0002" which has been already received at the above-mentioned step S11, discards (at step S13) the user data AMD_PDU2 corresponding to the sequence No. SN, and provides (at step S14) (at step K15) the generation instructions of the polling timer extension request (POLL) to the polling timer extension request (POLL) generator 302.

Figure 5:
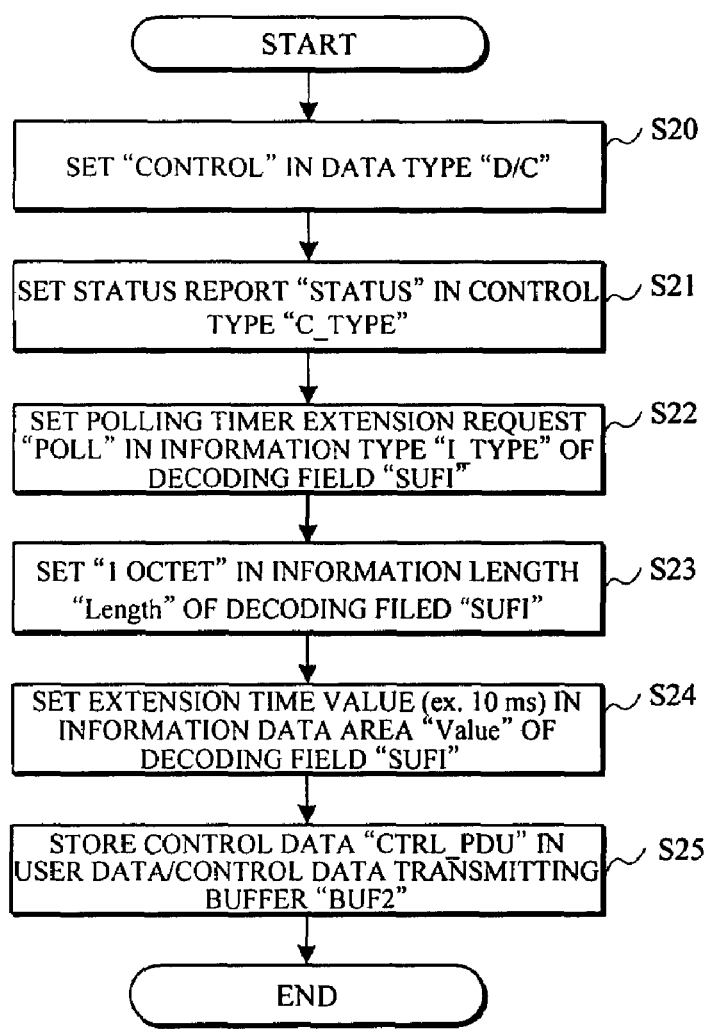
FIG. 5 is a flowchart showing an operation example of a polling timer extension request (POLL) generator used for the present invention.

The polling timer extension request (POLL) generator 302 having received the generation instructions sets (at steps S20 and S21), as shown in FIG. 5, "control" and "status report STATUS" respectively in the data type D/C and a control type C_TYPE within the control data CTRL_PDU format.

The polling timer extension request (POLL) generator 302 respectively sets (at steps S22-S24) "polling timer extension request POLL", "1 octet", and "extension time value (e.g. "10 ms")" in the information type I_TYPE, information length "Length", and information data "Value" of the decoding field SUFI.

The polling timer extension request (POLL) generator 302 stores (at step S25) the control data CTRL_PDU in the user data/control data transmitting buffer BUF2.

Thus, the polling timer extension request (POLL) is transmitted (at step K16)to the radio network control device 20.

Operation Example of Control Data Processor 400: FIGS. 1A, 1B, 2, and 6

Figure 6:
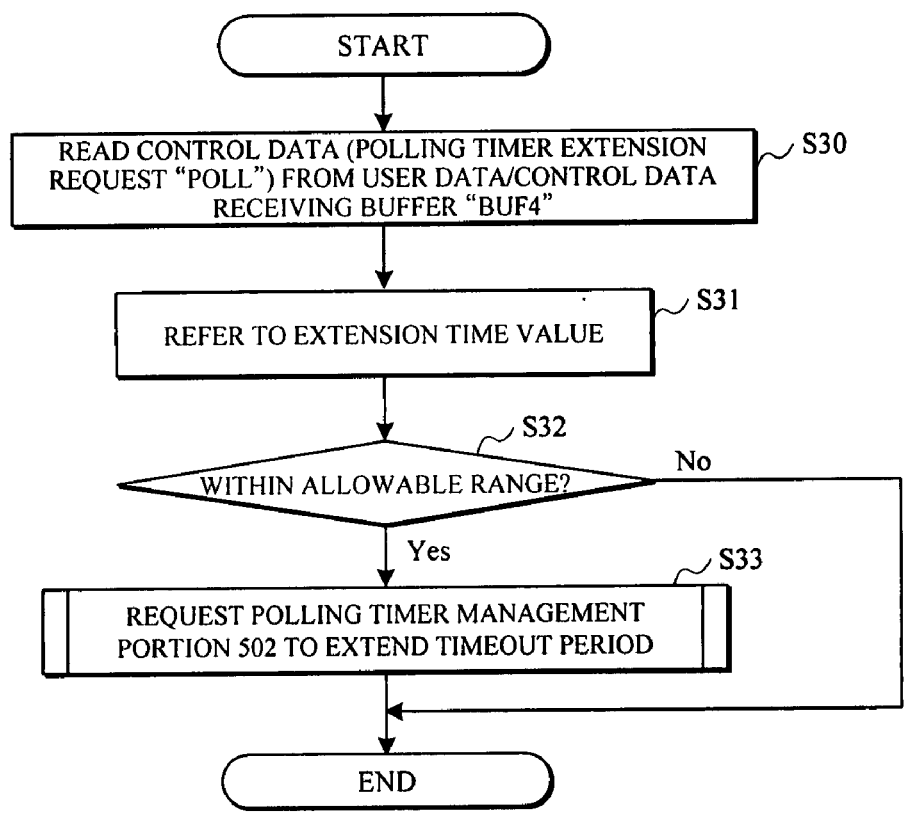
FIG. 6 is a flowchart showing an operation example of a polling timer extension request (POLL) processor used for the present invention.

The polling timer extension request (POLL) processor 401 within the control data processor 400 shown in FIG. 2 reads (at step S30) (at step K17) from the user data/control data receiving buffer BUF4, as shown in FIG. 6, the control data CTRL_PDU indicating the polling timer extension request (POLL) having received through the lower layer within the radio network control device 20.

The polling timer extension request (POLL) processor 401 refers (at step S31) to the extension time value (information data area "Value") designated by the polling timer extension request (POLL), and determines (at step S32) whether or not the extension time value is within the allowable range (i.e. whether or not the value is equal to or less than "0" or extremely large).

When the extension time value is within the allowable range, the polling timer extension request (POLL) processor 401 provides (at step S33) the timeout period extension request to the polling timer management portion 502.

On the other hand, when the extension time value is not a value within the allowable range, the polling timer extension request (POLL) processor 401 executes no processing.

Also, the ACK response processor 402 reads the control data CTRL_PDU indicating the ACK response from the user data/control data receiving buffer BUF4, and deletes the user data AMD_PDU for the ACK response from the user data retransmitting buffer BUF3, and provides (at steps K13 and K27) the timer stop request to the timer controller 501.

Also, the list (LIST) processor 403 reads the control data CTRL_PDU indicating the list (LIST) from the user data/control data receiving buffer BUF4, and provides the retransmission instructions of the user data AMD_PDU for the list (LIST) to the user data retransmission controller 503.

Operation Example of Retransmission Controller 500: FIGS. 1A, 1B, 2, 7, and 8

Figure 7:
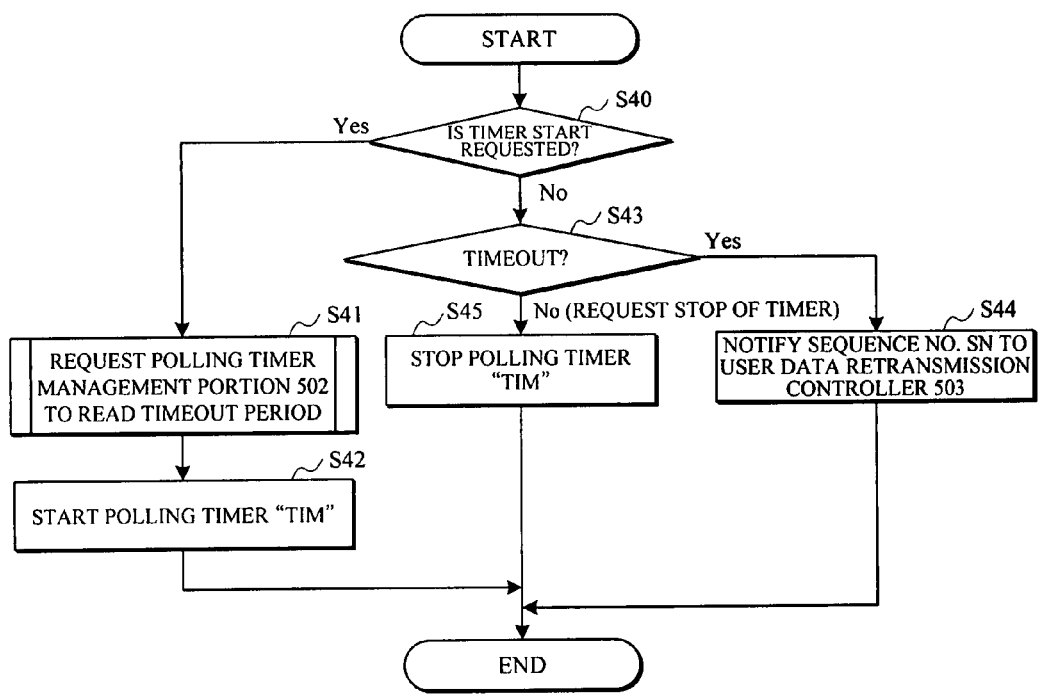
FIG. 7 is a flowchart showing an operation example [1] of a timer controller used for the present invention.

When the timer start request of the user data AMD_PDU2 (sequence No. SN "0002") for the ACK request is received (at step S40) from the above-mentioned user data/control data transmitter 103 as shown in FIG. 7, the timer controller 501 in the retransmission controller 500 shown in FIG. 2 provides (at step S41) the timeout period read request to the polling timer management portion 502.

Figure 8:
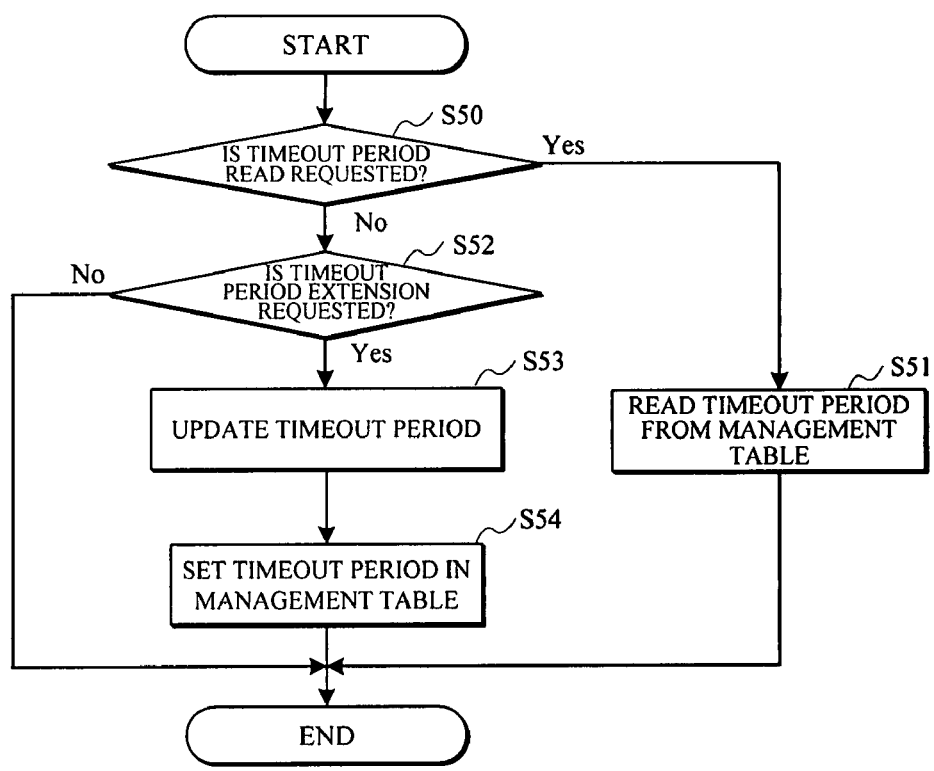
FIG. 8 is a flowchart showing an operation example [1] of a polling timer management portion used for the present invention.

The polling timer management portion 502 having received the timeout period read request reads, as shown in FIG. 8, the present timeout period $T_0$ (100 ms) from the management table (not shown) managed by itself to be returned (at steps S50 and S51) to the timer controller 501.

The timer controller 501 starts (at step S42) (at step K5) the polling timer (TIM) which measures time until the timeout $T_0$.

Also, when the polling timer (TIM) reaches the timeout $T_0$ (at step S43) (at step K11), the timer controller 501 notifies (at step S44) the sequence No. SN "0002" to the user data retransmission controller 503.

The user data retransmission controller 503 having received the sequence No. SN reads the user data AMD_PDU2 corresponding to the sequence No. SN "0002" from the user data retransmitting buffer to be stored in the user data/control data transmitting buffer BUF2.

Thus, the user data AMD_PDU2 read from the retransmitting buffer is transmitted (at step K12) to the user equipment 40.

Also, when no timer start request is received and the timeout has not occurred at the above-mentioned steps S40 and S43, the timer controller 501 stops (at step S45) the polling timer (TIM).

Also, when receiving (at step S52) the timeout period extension request (extension time value "10 ms") from the above-mentioned polling timer extension request (POLL) processor 401, the polling timer management portion 502 updates (at step S53), as shown in FIG. 8, the timeout period $T_0$ to a new timeout period $T_1$ ("110 ms") by extending only "10 ms", and sets (at step S54) (at step K17) the timeout period $T_1$ in the management table.

Thus, the retransmission time interval of the user data AMD_PDU5 for a subsequent ACK request is extended (at step K21).

Figure 10:
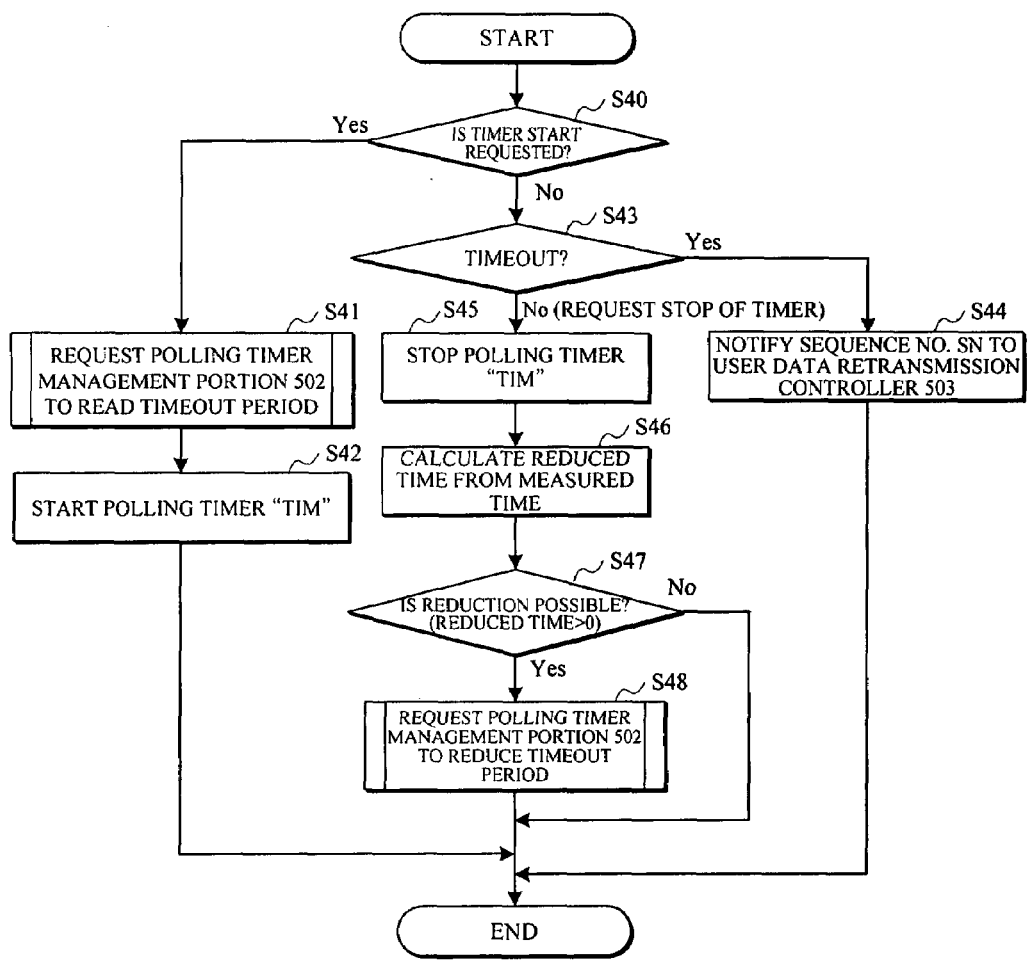
FIG. 10 is a flowchart showing an operation example [2] of a timer controller used for the present invention.
Figure 11:
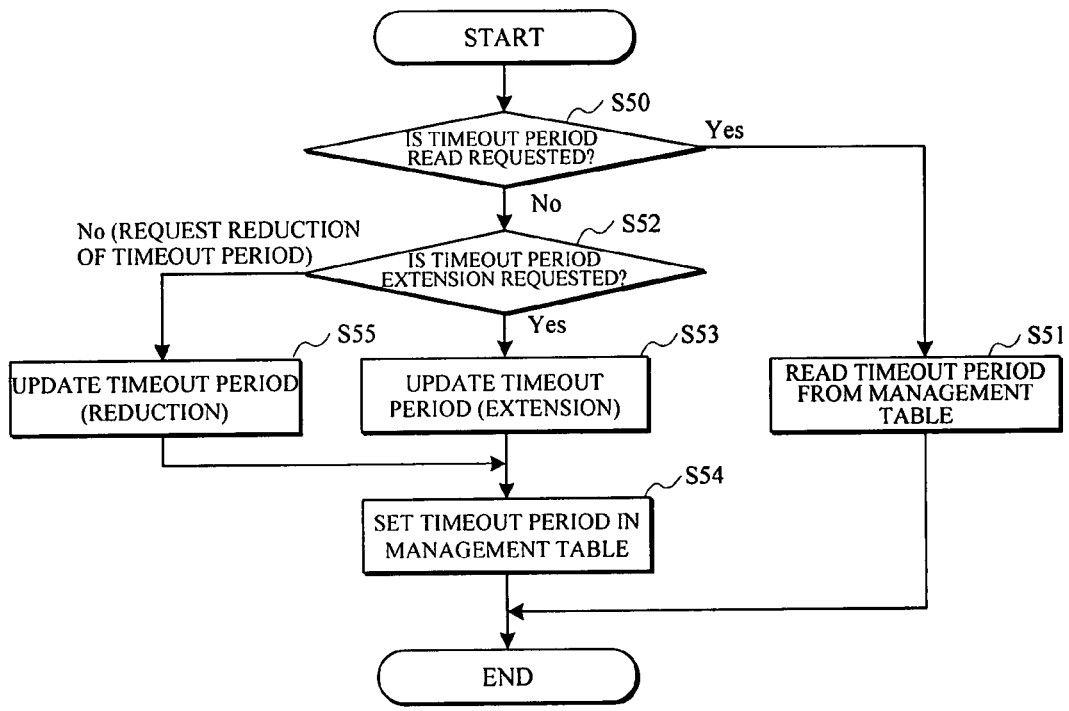
FIG. 11 is a flowchart showing an operation example [2] of a polling timer management portion used for the present invention.

⊚ Retransmission Control Embodiment [2] (Polling Timer Reduction): FIGS. 9-11

FIG. 9 is a sequence diagram showing an entire operation of the embodiment [2], dealing with a case where no processing congestion occurs in the user equipment 40 on the receiving side of the user data AMD_PDU.

In the same way as the above-mentioned retransmission control embodiment [1], the radio network control device 20 transmits to the user equipment 40 the user data AMD_PDU0-AMD_PUD2 (sequence No. SN "0000"-"0002") that are packet data SDU divided into three and their ACK request (the polling bit P of the user data AMD_PDU2 set to "1" (valid)), and waits for (at steps K1-K5) the ACK response from the user equipment 40.

It is to be noted that the timeout period $T_1$ of the polling timer (TIM) is set to "110 ms" as shown in FIG. 9.

The user equipment 40 transmits (at steps K6-K9) the ACK response, since no processing congestion occurs therein. The radio network control device 20 receives (at step K10) the ACK response within the timeout period $T_1$ of the polling timer (TIM). The ACK response processor 402 within the radio network control device 20 provides, as mentioned above, the timer stop request to the timer controller 501.

The timer controller 501 having received the timer stop request stops the polling timer (TIM), in the same way as the above-mentioned retransmission control embodiment [1].

The timer controller 501 performs processing of steps S46-S48 shown in FIG. 10, different from the above-mentioned retransmission control embodiment [1].

Namely, as having been shown in FIG. 9, when the measured time upon stoppage of the polling timer (TIM) is "60 ms", the timer controller 501 calculates (at step S46) the reduced time from this measured time.

While the timeout period $T_1$ is "110 ms", the measured time is "60 ms". Therefore, the timer controller 501 can reduce the timeout period $T_1$ by the remaining time ("50 ms") at the maximum, where in this embodiment, the reduced time is made "30 ms" in consideration of a variation of the processing time in the user equipment 40.

Accordingly, the timer controller 501 determines (at step S47) that the timeout period $T_1$ can be reduced (reduced time "30 ms">0), and provides (at step S48) the timeout period reduction request to the polling timer management portion 502.

The polling timer management portion 502 having received the request updates (at step S55), as shown in FIG. 11, the timeout period $T_1$ to a new timeout period $T_2$ ("80 ms") which is reduced by "30 ms", and sets (at step S54) the timeout period $T_2$ in the management table.

The radio network control device 20 measures (at steps K11-K14), as shown in FIG. 9, the retransmission time interval of the user data AMD_PDU5 for the subsequent ACK request (corresponding to user data AMD_PDU3-AMD_PDU5) with the timeout period $T_2$.

Thus, when the user data AMD_PDU5 for the ACK request is missing as shown by the mark e.g. "x" in FIG. 9 (at steps K15 and K16), the radio network control device 20 can retransmit (at step K17) the user data at a shorter retransmission time interval, thereby enabling the retransmission of the user data AMD_PDU5 to be expedited. Namely, the radio network control device 20 may set a time value which can be executed by the user equipment 40 as the reduced time value for the timeout period $T_1$.

It is to be noted that the present invention is not limited by the above-mentioned embodiments, and it is obvious that various modifications may be made by one skilled in the art based on the recitation of the claims.

What is claimed is:

1. A retransmission control method comprising:
a first step of receiving from a transmitting source a delivery acknowledgement request included in arbitrary first user data; and
a second step of transmitting to the transmitting source, when a delivery acknowledgement request included in second user data same as the first user data is redundantly received, control data for extending a retransmission time interval of user data for a subsequent delivery acknowledgement request.

2. The retransmission control method as claimed in claim 1, wherein the control data includes an identifier indicating the extension request of the retransmission time interval and an extension time value thereof.

3. The retransmission control method as claimed in claim 1, wherein each of the steps is executed based on an RLC protocol.

4. A retransmission control method comprising:
a first step of incorporating a delivery acknowledgement request into arbitrary user data to be transmitted; and
a second step of extending, when control data requesting an extension of a retransmission time interval of user data for a subsequent delivery acknowledgement request is received from a transmitting destination of the delivery acknowledgement request, the retransmission time interval based on the control data.

5. The retransmission control method as claimed in claim 4, wherein the control data includes an identifier indicating the extension request of the retransmission time interval and an extension time value thereof.

6. The retransmission control method as claimed in claim 4, wherein each of the steps is executed based on an RLC protocol.

7. A retransmission control method comprising:
a first step of determining whether or not a response to a delivery acknowledgement request incorporated into arbitrary user data is received from a transmitting destination within a retransmission time interval presently set; and
a second step of reducing, when the response is received within the retransmission time interval presently set, a retransmission time interval of user data for a subsequent delivery acknowledgement request to less than the retransmission time interval presently set.

8. The retransmission control method as claimed in claim 7, wherein the second step includes a step of stopping, when the response is received within the retransmission time interval presently set, a timer for measuring the retransmission time interval and assuming a time measured by the timer upon stopping the timer as the retransmission time interval.

9. The retransmission control method as claimed in claim 8, wherein the second step includes a step of further adding a predetermined time to the time measured by the timer upon stopping the timer to be assumed as the retransmission time interval.

10. The retransmission control method as claimed in claim 7, wherein each of the steps is executed based on an RLC protocol.

11. A retransmission control device comprising:
a first means receiving from a transmitting source a delivery acknowledgement request included in arbitrary first user data; and
a second means transmitting to the transmitting source, when a delivery acknowledgement request included in second user data same as the first user data is redundantly received, control data for extending a retransmission time interval of user data for a subsequent delivery acknowledgement request.

12. The retransmission control device as claimed in claim 11, wherein the control data includes an identifier indicating the extension request of the retransmission time interval and an extension time value thereof.

13. The retransmission control device as claimed in claim 11, wherein each of the means is mounted on an RLC protocol layer.

14. A retransmission control device comprising:
a first means incorporating a delivery acknowledgement request into arbitrary user data to be transmitted; and
a second means extending, when control data requesting an extension of a retransmission time interval of user data for a subsequent delivery acknowledgement request is received from a transmitting destination of the delivery acknowledgement request, the retransmission time interval based on the control data.

15. The retransmission control device as claimed in claim 14, wherein the control data includes an identifier indicating the extension request of the retransmission time interval and an extension time value thereof.

16. The retransmission control device as claimed in claim 14, wherein each of the means is mounted on an RLC protocol layer.

17. A retransmission control device comprising:
a first means determining whether or not a response to a delivery acknowledgement request incorporated into arbitrary user data is received from a transmitting destination within a retransmission time interval presently set; and
a second means reducing, when the response is received within the retransmission time interval presently set, a retransmission time interval of user data for a subsequent delivery acknowledgement request to less than the retransmission time interval presently set.

18. The retransmission control device as claimed in claim 17, wherein the second means includes a means stopping, when the response is received within the retransmission time interval presently set, a timer for measuring the retransmission time interval and assuming a time measured by the timer upon stopping the timer as the retransmission time interval.

19. The retransmission control device as claimed in claim 18, wherein the second means includes a means further adding a predetermined time to the time measured by the timer upon stopping the timer to be assumed as the retransmission time interval.

20. The retransmission control device as claimed in claim 17, wherein each of the means is mounted on an RLC protocol layer.

* * * * *